United States Patent
Nakamura

[11] Patent Number: 5,892,977
[45] Date of Patent: Apr. 6, 1999

[54] APPARATUS AND METHOD FOR READ-ACCESSING WRITE-ONLY REGISTERS IN A DMAC

[75] Inventor: Nobutaka Nakamura, Tokyo, Japan

[73] Assignee: Kabushiki Kaisha Toshiba, Kawasaki, Japan

[21] Appl. No.: 694,757

[22] Filed: Aug. 9, 1996

[30] Foreign Application Priority Data

Aug. 11, 1995 [JP] Japan .................................... 7-205681

[51] Int. Cl.$^6$ .................................................. G06F 13/10
[52] U.S. Cl. .......................................... 395/842; 711/154
[58] Field of Search ..................................... 395/842–848

[56] References Cited

U.S. PATENT DOCUMENTS

| | | | |
|---|---|---|---|
| 5,269,015 | 12/1993 | Shires ..................................... | 711/211 |
| 5,434,979 | 7/1995 | Warner ...................................... | 711/4 |
| 5,574,869 | 11/1996 | Young et al. ............................ | 395/306 |
| 5,666,556 | 9/1997 | Khandekar et al. ..................... | 395/822 |
| 5,748,922 | 5/1998 | Smith et al. ............................. | 395/309 |

FOREIGN PATENT DOCUMENTS

| | | |
|---|---|---|
| 58-114258 | 7/1983 | Japan . |
| 63-20545 | 1/1988 | Japan .............................. G06F 11/28 |
| 63-81537 | 4/1988 | Japan . |
| 2-281341 | 11/1990 | Japan .............................. G06F 11/28 |
| 4-190430 | 7/1992 | Japan .............................. G06F 11/22 |

OTHER PUBLICATIONS

PCI Local Bus Specification, PCI Special Interest Group, Revision 2.1, Jun. 1, 1995.

"82C37A-5 CHMOS High Performance Programmable DMA Controller," Intel: *Peripheral Components,* 1993, pp. 3–33 to 3–50.

Mobile PC/PCI DMA Arbitration and Protocols: MHPG Architecture Functional Architecture Specification, Intel Corporation, Revision 2.2, Apr. 22, 1996.

*Primary Examiner*—Meng-Ai T. An
*Assistant Examiner*—Sumati Lefkowitz
*Attorney, Agent, or Firm*—Finnegan, Henderson, Farabow, Garrett & Dunner, L.L.P.

[57] ABSTRACT

A computer system has an I/O address space with an ISA bus, and a configuration address space with a PCI bus, further the system including an ISA DMA (Direct Memory Access) controller with two or more DMA channels on the ISA bus, an I/O register implemented in the DMA controller for storing information for DMA transfer on each of the DMA channels, and a register control logic device for controlling read/write-access to the I/O register. The I/O registers are allocated to the I/O address space, and further write-only registers in the I/O registers are allocated to the configuration address space. When a HOST-PCI bridge device generates a configuration read cycle through the configuration address space on the PCI bus, the register control logic device read-accesses the write-only registers, in response to the generated configuration read cycle.

20 Claims, 6 Drawing Sheets

| REGISTER NAME | SIZE | I/O PORT | Config. ADDRESS |
|---|---|---|---|
| DMAC#1 ch. 0 BASE ADDRESS | 16bit | 0000h W | A0h+0~1 R/W |
| DMAC#1 ch. 1 BASE ADDRESS | 16bit | 0002h W | A8h+0~1 R/W |
| DMAC#1 ch. 2 BASE ADDRESS | 16bit | 0004h W | B0h+0~1 R/W |
| DMAC#1 ch. 3 BASE ADDRESS | 16bit | 0006h W | B8h+0~1 R/W |
| DMAC#1 ch. 0 CURRENT ADDRESS | 16bit | 0000h R/W | A4h+0~1 R/W |
| DMAC#1 ch. 1 CURRENT ADDRESS | 16bit | 0002h R/W | ACh+0~1 R/W |
| DMAC#1 ch. 2 CURRENT ADDRESS | 16bit | 0004h R/W | B4h+0~1 R/W |
| DMAC#1 ch. 3 CURRENT ADDRESS | 16bit | 0006h R/W | BCh+0~1 R/W |
| DMAC#1 ch. 0 BASE WORD | 16bit | 0001h W | A0h+2~3 R/W |
| DMAC#1 ch. 1 BASE WORD | 16bit | 0003h W | A8h+2~3 R/W |
| DMAC#1 ch. 2 BASE WORD | 16bit | 0005h W | B0h+2~3 R/W |
| DMAC#1 ch. 3 BASE WORD | 16bit | 0007h W | B8h+2~3 R/W |
| DMAC#1 ch. 0 CURRENT WORD | 16bit | 0001h R/W | A4h+2~3 R/W |
| DMAC#1 ch. 1 CURRENT WORD | 16bit | 0003h R/W | ACh+2~3 R/W |
| DMAC#1 ch. 2 CURRENT WORD | 16bit | 0005h R/W | B4h+2~3 R/W |
| DMAC#1 ch. 3 CURRENT WORD | 16bit | 0007h R/W | BCh+2~3 R/W |
| DMAC#1 COMMAND REGISTER | 2bit | 0008h W | E0h+1 R/W |
| DMAC#1 TC REGISTER | 4bit | 0008h R | E0h+0 R/W |
| DMAC#1 REQUEST REGISTER | 4bit | 0009h W | E0h+2 R/W |
| DMAC#1 MASK REGISTER | 4bit | 000Ah W<br>000Eh W<br>000Fh W | E0h+3 R/W |
| DMAC#1 ch. 0 MODE REGISTER | 6bit | 000Bh W | E4h+0 R/W |
| DMAC#1 ch. 1 MODE REGISTER | 6bit | 000Bh W | E4h+1 R/W |
| DMAC#1 ch. 2 MODE REGISTER | 6bit | 000Bh W | E4h+2 R/W |
| DMAC#1 ch. 3 MODE REGISTER | 6bit | 000Bh W | E4h+3 R/W |

FIG. 2

| REGISTER NAME | SIZE | I/O PORT | Config. ADDRESS |
|---|---|---|---|
| DMAC#2 ch. 4 BASE ADDRESS | 16bit | 00C0h W | C0h+0~1 R/W |
| DMAC#2 ch. 5 BASE ADDRESS | 16bit | 00C4h W | C8h+0~1 R/W |
| DMAC#2 ch. 6 BASE ADDRESS | 16bit | 00C8h W | D0h+0~1 R/W |
| DMAC#2 ch. 7 BASE ADDRESS | 16bit | 00CCh W | D8h+0~1 R/W |
| DMAC#2 ch. 4 CURRENT ADDRESS | 16bit | 00C0h R/W | C4h+0~1 R/W |
| DMAC#2 ch. 5 CURRENT ADDRESS | 16bit | 00C4h R/W | CCh+0~1 R/W |
| DMAC#2 ch. 6 CURRENT ADDRESS | 16bit | 00C8h R/W | D4h+0~1 R/W |
| DMAC#2 ch. 7 CURRENT ADDRESS | 16bit | 00CCh R/W | DCh+0~1 R/W |
| DMAC#2 ch. 4 BASE WORD | 16bit | 00C2h W | C0h+2~3 R/W |
| DMAC#2 ch. 5 BASE WORD | 16bit | 00C6h W | C8h+2~3 R/W |
| DMAC#2 ch. 6 BASE WORD | 16bit | 00CAh W | D0h+2~3 R/W |
| DMAC#2 ch. 7 BASE WORD | 16bit | 00CEh W | D8h+2~3 R/W |
| DMAC#2 ch. 4 CURRENT WORD | 16bit | 00C2h R/W | C4h+2~3 R/W |
| DMAC#2 ch. 5 CURRENT WORD | 16bit | 00C6h R/W | CCh+2~3 R/W |
| DMAC#2 ch. 6 CURRENT WORD | 16bit | 00CAh R/W | D4h+2~3 R/W |
| DMAC#2 ch. 7 CURRENT WORD | 16bit | 00CEh R/W | DCh+2~3 R/W |
| DMAC#2 COMMAND REGISTER | 2bit | 00D0h W | E8h+1 R/W |
| DMAC#2 TC REGISTER | 4bit | 00D0h W | E8h+0 R/W |
| DMAC#2 REQUEST REGISTER | 4bit | 00D2h W | E8h+2 R/W |
| DMAC#2 MASK REGISTER | 4bit | 00DAh W<br>00DCh W<br>00DEh W | E8h+3 R/W |
| DMAC#2 ch. 4 MODE REGISTER | 6bit | 00D6h W | ECh+0 R/W |
| DMAC#2 ch. 5 MODE REGISTER | 6bit | 00D6h W | ECh+1 R/W |
| DMAC#2 ch. 6 MODE REGISTER | 6bit | 00D6h W | ECh+2 R/W |
| DMAC#2 ch. 7 MODE REGISTER | 6bit | 00D6h W | ECh+3 R/W |

FIG. 3

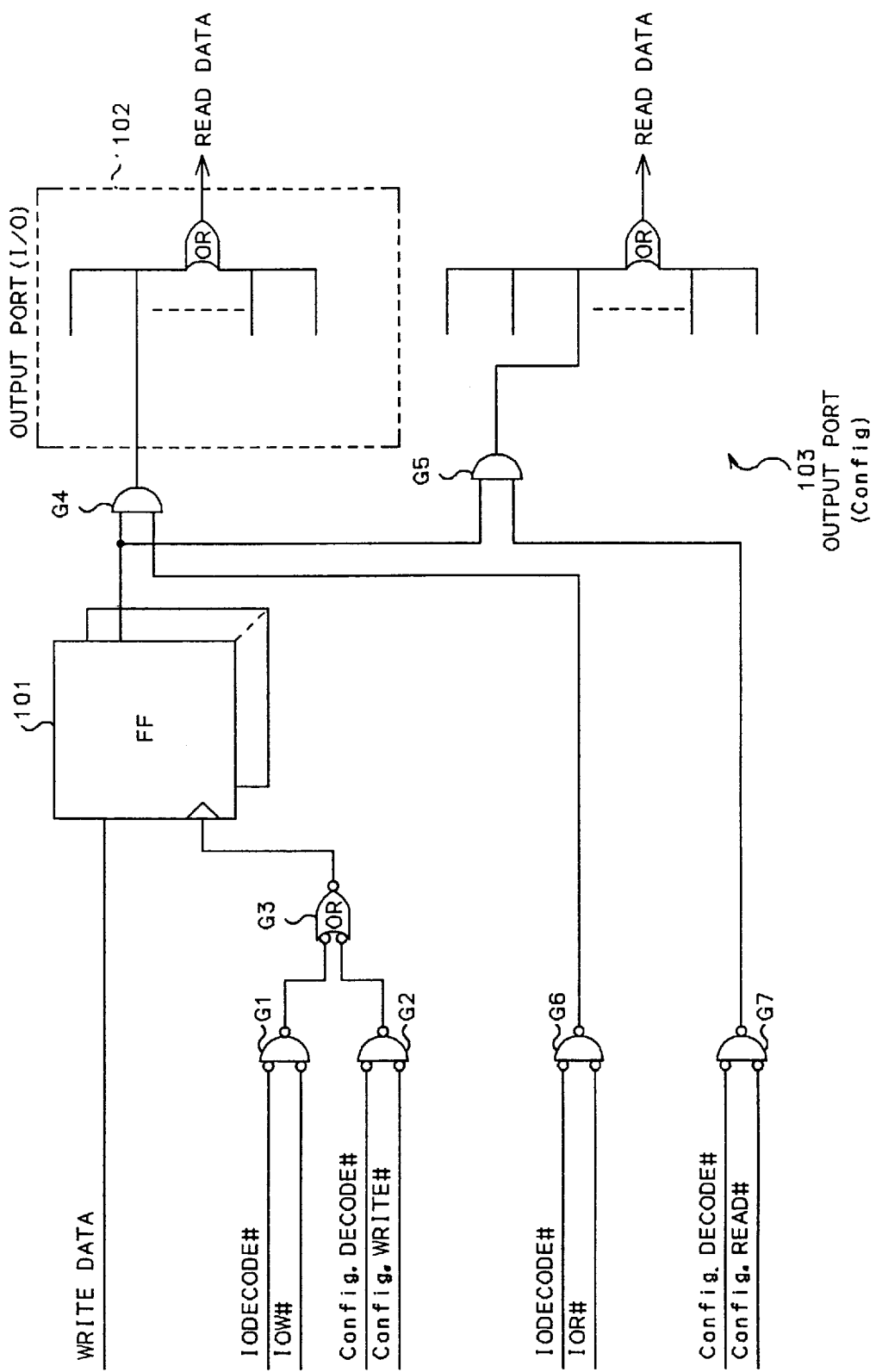
F I G. 4

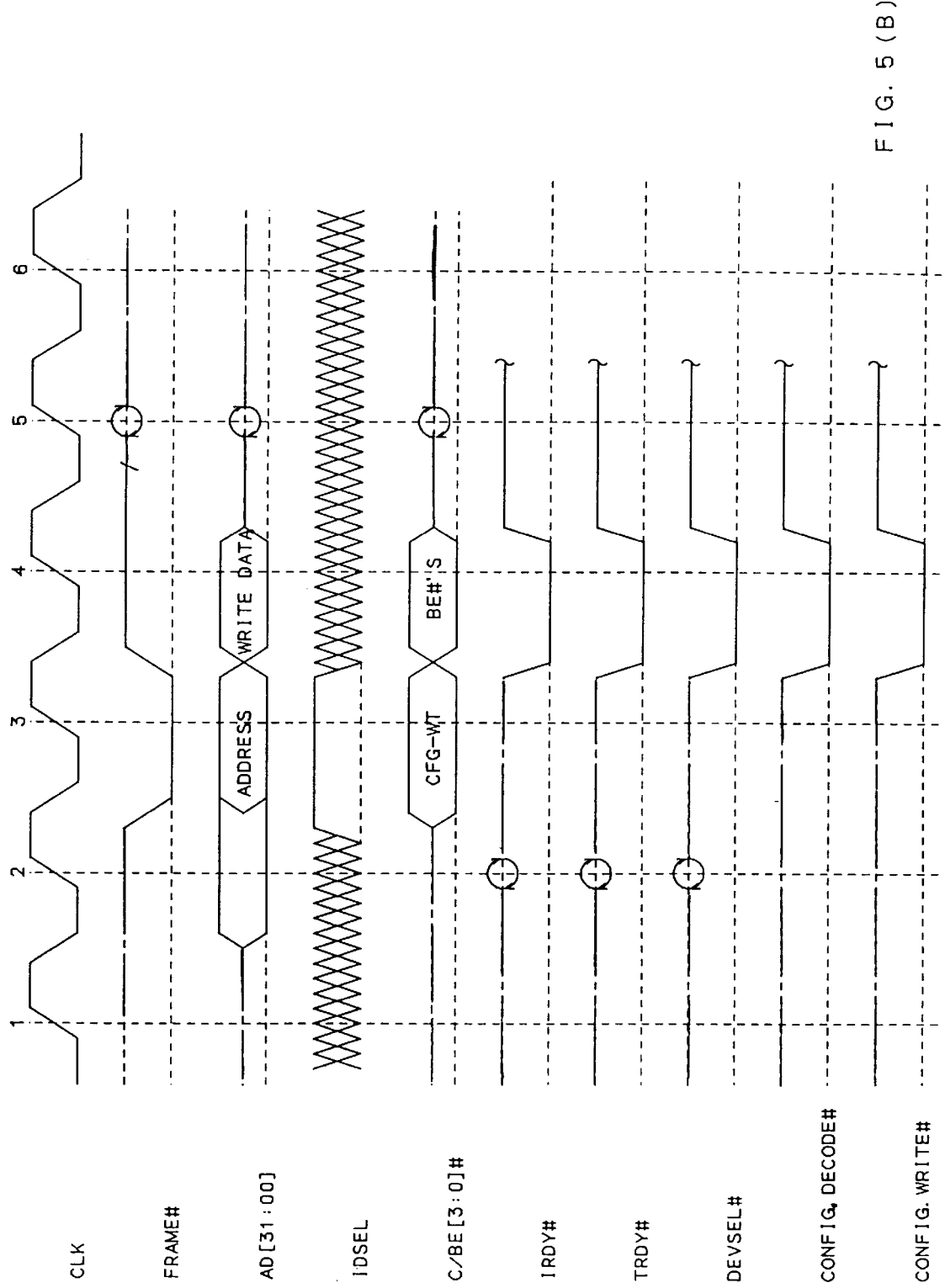

APPARATUS AND METHOD FOR READ-ACCESSING WRITE-ONLY REGISTERS IN A DMAC

BACKGROUND OF THE INVENTION

The present invention concerns a Direct Memory Access (DMA) controller installed in a computer system, and especially reading write-only registers in such a DMA controller.

Although ISA (Industry Standard Architecture) and EISA (Extended ISA) buses are conventional in system buses used in personal computers, recently a Peripheral Component Interconnect (PCI) bus has been employed in desktop type personal computers to increase the speed of data transfer and organize system architecture, independently of the kind of processors.

In a PCI bus, block transfer is the basis of substantially all data transfer. Transfer of each block is done by burst transmission. For example, a maximum data transfer speed of 133 megabytes/sec is used when a data bus has a width of 32 bits. Therefore, when a PCI bus is used, data transfer between I/O devices and between a system memory and an I/O device is executed at a high speed and system performance is increased.

Recently, PCI buses have been used not only in desktop type personal computers, but in portable personal computers such as notebook computers. Since the specification of the PCI bus does not support DMA transfer supported in the ISA bus, it is necessary to install a Direct Memory Access Controller (DMAC) in the PCI bus system to use an ISA device with the PCI bus system. The DMAC supports two or more channels, and has several I/O registers for maintaining the DMA transfer mode and an address by each DMA channel.

However, the majority of these I/O registers are write-only registers, making them inconvenient to debug. Since both readable/writable I/O registers and write-only I/O registers in the DMAC are usually composed of a flip-flop, hardware logic for reading/writing data from the registers is comparatively easily changed so that data from a write-only register can be read under an I/O address corresponding to the write-only I/O register. However, if the I/O address is used so that this write-only register can be read, a problem arises with the compatibility of the ISA standard architecture.

The purpose of the present invention is to read a write-only register, compatible with ISA standard architecture.

Another purpose of the present invention is to provide a DMA controller capable of reading write-only registers therein.

DESCRIPTION OF THE INVENTION

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof, as well as the appended drawings.

In accordance with the present invention, the foregoing objects, among others, are achieved by providing, a computer system comprising a DMA (Direct Memory Access) controller, I/O registers, implemented in the DMA controller, for storing information for DMA transfers on each of DMA channels, the I/O registers being assigned to a first address space, means for allocating a second address space different from the first address space to write-only register in the I/O registers, and means for read-accessing contents of the write-only register, in response to a read cycle in the second address space.

There has also been provided, in accordance with yet another aspect of the present invention, a method of read-accessing I/O registers in a DMA (Direct Memory Access) controller with two or more DMA channels, the method comprising the steps of first allocating to a first address space to the I/O registers including a write-only register, second allocating a second address space different from the first address space to the I/O register, generating a configuration read cycle to read-access the I/O through the second address space, and reading contents of the I/O registers, in response to the generated read cycle.

In a computer system of the present invention, a second address space that differs from first address space is allocated to write-only registers in the DMA controller. If the first address space is used, write-only registers are write-only accessed. However, if the second address space is used, write-only registers can be read-accessed or write-accessed.

Therefore, the write-only registers are write-only registers in the first address space. However, if the second address space is used, the write-only registers become a readable or writable register.

Moreover, when the DMA controller is installed in the PCI bus system, configuration addresses can be used as the second address space. That is, the write-only registers in the ISA DMAC can be read-accessed or write-accessed, having compatibility with an ISA standard architecture.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

In the Drawings:

FIG. 2 and 3 illustrate the allocation of an I/O address and a configuration address against DMAC I/O registers installed in the system of the first embodiment of the present invention.

FIG. 4 is a circuit diagram of the configuration of a register control logic in the DMAC of the first embodiment of the present invention.

FIGS. 5(A) and 5(B) are timing charts of read-access or write-access of one register in the ISA DMAC using the register control logic shown in FIG. 4.

DESCRIPTION OF THE PREFERRED EMBODIMENTS

Reference will now be made in detail to the construction and operation of preferred embodiments of the present invention, which are illustrated in the accompanying drawings. In those drawings, like elements and operations are designated with the same reference numbers.

Figure 1:
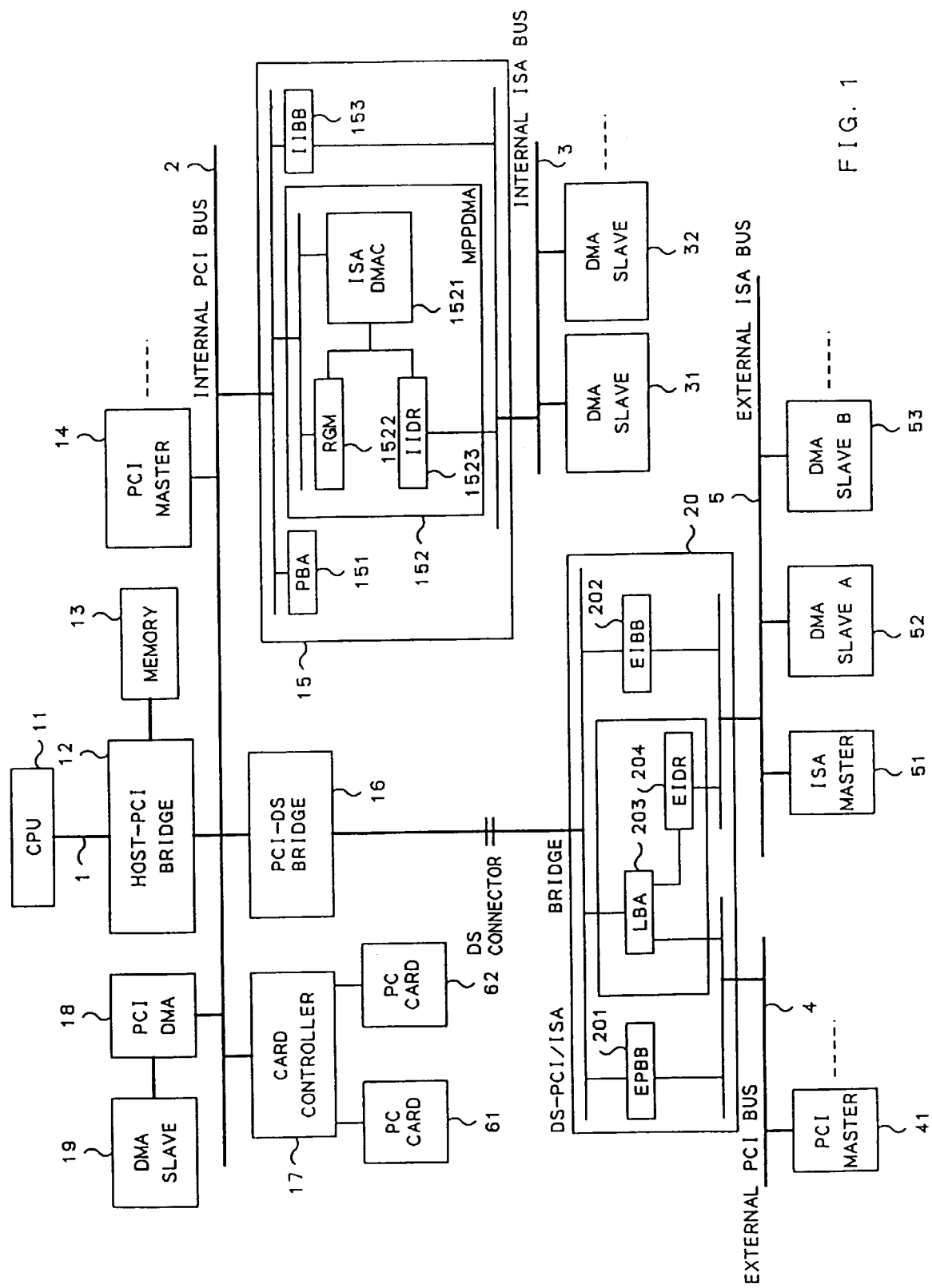
FIG. 1 is a block diagram of the system configurations of a portable computer in accordance with a first embodiment of the present invention.

In FIG. 1 the structure of a computer system according to an embodiment of the present invention is explained. The computer system is preferably a notebook type or laptop portable computer. Three types of buses, i.e., a processor bus 1, an internal PCI bus 2, 1 and an internal ISA bus 3, are arranged on the system board thereof. An external PCI bus 4 and an external ISA bus 5 are arranged in a desk station connected to a DS connector of the portable personal computer.

A CPU 11, a HOST-PCI bridge device 12, a system memory 13, various types of PCI master devices 14, an internal PCI-ISA bridge device 15, a PCI-DS (desk station), a bridge device 16, a PC card controller 17, and a DMA device 18 are provided on the system board. Also, a DS-PCI/ISA bridge device 20 is provided in the desk station.

The CPU 11 is preferably the "Pentium" microprocessor produced by Intel. The processor bus 1, directly connected to input/output pins of the CPU 11, is a 64-bit data bus.

The system memory preferably stores an operating system, device drivers, application programs to be executed, and processing data. The memory device is preferably formed by a plurality of DRAMs. The system memory 13 is connected to the HOST-PCI bridge device 12 via a memory bus having a 32-bit or 64-bit data bus. The processor bus 1 is utilized as the data bus of the memory bus. The memory bus is formed by an address bus and various types of memory control signal lines.

The HOST-PCI bridge device 12 is preferably a bridge LSI for coupling the processor bus 1 and the internal PCI bus 2, and functions as one bus master of the PCI bus. The HOST-PCI bridge device 12 directionally converts bus cycles including data and addresses and controls access of the system memory via the memory bus, between the processor bus 1 and the internal PCI bus 2.

The internal PCI bus 2 is a preferably a clock-synchronization type input/output bus. All cycles of the internal PCI 2 bus are performed in synchronization with a PCI bus clock. The frequency of the PCI bus clock is preferably at a maximum 33 MHz. The internal PCI bus 2 preferably has an address/data bus used in a time division manner. This address/data bus preferably has a width of 32 bits.

A data transfer cycle on the internal PCI bus 2 is performed from an address phase and one or more data phases following thereafter. An address and transfer type are output in the address phase and 8-bit, 16-bit, 24-bit or 32-bit data are output in the data phases.

The PCI master device 14 is one bus master of the internal PCI bus 2 as well as the HOST-PCI bridge device 12, and operates as an initiator or target. All devices on the internal PCI bus 2 work as a target even without the function of a bus master. The target means a resource specified by an address output from an initiator, that is, a bus master that began the transaction.

The internal PCI-ISA bridge device 15 is a bridge LSI for coupling the internal PCI bus 2 and the internal ISA bus 3. A memory and a plurality of ISA I/O devices 31 and 32 are connected to the internal ISA bus 3. These I/O devices 31 and 32 are devices for requesting DMA transfer to a DMAC 1521 incorporated in the internal PCI-ISA bridge device 15. The I/O devices 31 and 32 are also called DMA slaves.

A PCI bus arbiter (PBA) 151, a DMAC core (MPPDMA) 152, and an internal ISA bus bridge (IIBB) 153 are incorporated in the internal PCI-ISA bridge device 15.

The PCI bus arbiter (PBA) 151 arbitrates bus access between all bus master devices 14 connected to the internal PCI bus 2. In this arbitration, signal lines (a bus request signal REQ# line and a grant signal GNT# line) on the internal PCI bus 2 are allocated in one pair to each bus master device 14.

A bus request signal REQ# is a signal for notifying the PBA 151 of a request from a device corresponding therewith to use the internal PCI bus 2. A grant signal GNT# is a signal for notifying a device that issued a bus request signal REQ# that it has access use of the internal PCI bus 2.

Also, in this system, among the plurality of groups of REQ# and GNT# lines defined on the internal PCI bus 2, one REQ# and GNT# line group allocated to the DS-PCI/ISA bridge device 20 is used for a DMA serial channel protocol for transmission and reception of DEQs and DAC#s between DMA slaves connected to the external ISA bus 5.

All of the bus request signal REQ# lines and grant signal GNT# lines on the internal PCI bus 2 are connected to the PCI bus arbiter (PBA) 151. Arbitration of bus access is controlled by the PCI bus arbiter (PBA) 151.

The DMAC core (MPPDMA) 152 preferably comprises an ISA DMAC 1521, a bus request and grant manager (RGM) 1522, which is the REQ# and GNT# manager and an internal ISA DMA router (IIDR) 1523. The DMAC core (MPPDMA) 152 is an independent component within the internal PCI-ISA bridge device 15.

The ISA DMAC 1521 is a bus master connected to the internal PCI bus 2, and executes DMA transfer, according to a request from a MDA slave device 31 and 32 requiring DMA transfer. DMA slaves 31 and 32 are logically connected to the internal PCI bus 2. Typically, the DMA slaves 31 and 32, and 52 and 53 are connected to the internal ISA bus 3 or the external ISA bus 5 through a bridge 15 or 20, respectively.

The ISA DMAC 1521 preferably has a DREQ input port where internal DREQs 0 to 7 are input, and a DACK# output port for outputting internal DAC#s 0 to 7. Both the DREQ input port and the DACK# output port are connected to the RGM 1522 and the IIDR 1523. Transmission and reception of DREQs and DACK#s between the DMA slaves 31 and 32, and the ISA DMAC 1521 on the Internal ISA bus 3 are executed via the IIDR 1523. Also, transmission and reception of DREQs and DAC#s between an ISA master 51 and DMA slaves 52 and 53 on the external ISA bus 5 and the ISA DMAC 1521 are performed by a DMA serial channel protocol via the RGM 1522.

The ISA DMAC 1521 is connected to the internal PCI bus 2 and the devices requesting DMA transfer are connected to the internal ISA bus 3 for the external ISA bus 5. A read cycle (I/O read or memory read) and a write cycle (memory write or I/O write) are simultaneously not generated in DMA transfer by the ISA DMAC 1521. That is, first, a read cycle is performed and the read data at that time are latched to a buffer in the ISA DMAC 1521. Next, a write cycle is executed and the previously latched data are output as write data.

The ISA DMAC 1521 generates both a read cycle and a write cycle on the internal PCI bus 2, irrespective of whether they are memory or I/O. Further, the bridge devices 15 and 20 convert a bus cycle on the internal PCI bus 2 on an ISA bus cycle. Preferably, the ISA DMAC 1521 generates both memory cycles and DMA exclusive I/O cycles on the internal PCI bus 2 and is not concerned with ISA bus cycles.

The ISA DMAC 1521 has one 82C37 compatible function that is the ISA bus system architecture standard, and preferably supports DMA channels CH0 to CH7 by means of internal DREQs 0 to 7 and internal DAC#s 0 to 7. The ISA DMAC 1521 also has I/O registers to maintain information in a DMA transfer mode, a transfer count value, that is, number of bursts that should be transferred, and a beginning memory address and a direction of transfer in each of the DMA channels. The I/O registers are mapped by predetermined I/O address spaces.

In addition, the I/O registers are mapped in the configuration address space of the PCI system, and a logic device to read or write the I/O registers by the configuration address is preferably installed in the ISA DMAC 152 in the system according to the present invention.

The allocation of the I/O addresses and the configuration addresses of the I/O registers in the ISA DMAC 152, and the configuration of the logic device to read or write the I/O registers by the configuration addresses are explained in detail with respect to FIG. 2.

The ISA DMAC 152 performs arbitration of the DMA channels by using the internal DREQs 0 to 7 and internal DACK#s 0 to 7 prepared as one pair each for every DMA channel. AN internal DREQ is a DMA request signal used to notify the ISA DMAC 152 that a DMA slave, 31 or 32 is requesting execution of DMA transfer. A DACK# is a DMA acknowledgment signal by which the ISA DMAC 152 notifies commencement of DMA cycle execution to a DMA slave 31 or 32 that has requested DMA transfer. The DMA slave 31 or 32 that is the subject of DMA transfer is selected by this DACK#.

Allocation of the DMA channels is exclusively performed between the devices on the internal ISA bus 3 and devices on the external ISA bus 5. Each device transmits to and receives from the ISA DMAC 152 by using the DREQ and DACK# corresponding to the DMA channel allocated thereto.

Transmission and reception of the DREQ and DACK# between the external ISA bus 5 and the ISA DMAC 152, as described above, are executed, according to the DMA serial channel protocol by using one group of serial REQ# and serial GNT# signal lines. The DMA serial channel protocol can decrease the number of signal lines that are supplied to the desk station, and use the PCI expansion cards and ISA expansion cards therein.

In the DMA serial channel protocol, the most recent DREQ state is transmitted from the DS-PCI/ISA bridge device 20 by a serial REQ#. This is sent to the RGM 1522. In the RGM 1522, the serial REQ# is converted to internal DREQs 0 to 7 for the ISA DMAC 1521. Further, channel information of the DMA transfer indicated by the internal DACK#s 0 to 7 and output from the ISA DMAC 1521 is sent to the DSPCI/ISA bridge device 20 by a serial transfer by using the serial GNT# signal line and executed by the RGM 1522.

The ISA DMAC 1521 performs 82C37 compatible arbitration between DREQ channels, according to setting and adjustment of a DREQ channel mask, based on the most recent DREQ channel information provided from the RGM 1522 and the IIDR 1523. If there is an effective DMA request (DREQ), the ISA DMAC 1521 first activates a REQ# allocated to itself and sends a request for bus access to the PCI bus arbiter (PBA) 15. The ISA DMAC 1521 waits for a GNT# to be granted by the PBA 15.

When the GNT# is provided from the PBA 15 to the ISA DMAC 1521, the ISA DMAC 1521 activates an internal DACK# corresponding to a DMA channel number selected as a result of the arbitration. A DMA channel number at which DMA transfer was executed is returned to the RGM 1522 and the IIDR 1523. The ISA DMAC 1521 executes a DMA cycle corresponding to a DMA transfer mode (single transfer mode, block transfer mode, demand transfer mode, and cascade mode) regulated by setup information on a selected DMA channel. In this case, the ISA DMAC 1521 supports only bus cycles of the PCI bus for both memory and I/O cycles, as described previously. The bus cycles in the ISA bus are emulated by the PCI-ISA bridge device 15 and the DSPCI/ISA bridge device 20.

Memory cycles generated on the PCI bus are converted by the HOST-PCI bridge 15 into DRAM access cycles to read or write-access the system memory.

The RGM 1522 serializes the plurality of DMA channels and manages the states of the serial REQ# and the serial GNT# in order to perform processes relating to the DMA serial channel protocol. The RGM 1522 performs conversion between the DMA serial channel protocol and the DREQ/DACK# protocol of the ISA style regarding the ISA DMAC 1521.

The REQ# signals are input to the RGM 1522. Also, the protocol of the REQ# is programmed for each REQ# signal. Consequently, if a number of pairs of REQ# and GNT# signal lines used as serial REQ#s and serial GNT#s are prepared, not only reception and transmission of DREQs and DACK#s between devices on the external ISA bus 5, which are performed through the DS-PCI/ISA bridge device 20, but also reception and transmission of DREQs and DACK#s between, for example, PC cards 61 and 62 of the PC card controller 17 and the ISA DMAC 1521 is performed by the DMA serial channel protocol.

The RGM 1522 converts between the DMA serial channel protocol and the REQ#/GNT protocol for arbitration of the standard PCI style supported by the PBA 151. This is described in the publication "PCI Local Bus", Revision 2.01, Oct. 20, 1994, PCI Special Interest Group, pp. 47–52.

Not only reception and transmission of DREQs and DACK#s with devices on the external ISA bus 15, but also reception and transmission of REQs and GNT#s with the PCI master 14 on the external PCI bus 4 are performed using the DMA serial channel protocol. Processing of the REQ#s and GNT#s in this case is performed, as described below, by the RGM 1522.

The PCI master 14, such as a LAN board or an SCSI board, on the external PCI bus 4 informs the DS-PCI/ISA bridge device 20 of a bus access request by activating the REQ#. The DS-PCI/ISA bridge device 20 informs the RGM 1522 of the bus access request by serial data transfer using the serial REQ#. In such a case, notification of the bus access request preferably uses DREQ4 which is the DMA channel not used by an ISA device.

The RGM 1522 decomposes the serial REQ# signal, and, upon detecting that the DREQ4 has been notified by the serial REQ#, activates the REQ# and makes a request to the PBA 151 for bus access. The PBA 151 arbitrates upon the standard PCI rule and enables bus access for the RGM 1522 by means of a GNT#.

The RGM 1522, upon receiving the GNT# from the PBA 151, notifies the DSPCI/ISA bridge device 20, by means of serial transfer data using a serial GNT#, that bus access was enabled. The DACK 4 is used in this notification. The DS-PCHSA bridge device 20 decomposes the serial GNT# to the PCI master 14. The PCI master 14 commences a bus cycle upon receiving the GNT#.

The internal ISA DMA router (IIDR) 1523 is explained below. The IIDR 1523 changes a mapped DMA channel to the DMA slaves on the internal ISA bus 3, according to programmed mapping information. The IIDR 1523 converts the states of DREQ signals from the DMA slaves 31 and 32 to internal DREQs corresponding to the DMA channel numbers of these devices, according to mapping information, and sends them to the ISA DMAC 1521. Further, the IIDR 1523 converts internal DACK#s from the ISA DMAC to DACK#s that are actually used by the DMA slaves 31 and 32, according to mapping information, and outputs them to the internal ISA bus 3.

The internal ISA bus bridge (IIBB) 153 is a bridge LSI for connecting the internal PCI bus 2 and the internal ISA bus 3, and controls all devices on the internal ISA bus 3 such as memories and I/Os. The IIBB 153 protocol-converts memory or I/O cycles generated on the internal PCI bus 2 for DMA transfer by the ISA DMAC 1521, and sends them to the internal ISA bus 3.

The PCI-DS bridge device 16 is a bridge LSI for connecting the internal PCI bus 2 and a docking bus corresponding to the PCI bus leading out to a desk station, and functions as an agent on the PCI bus. A buffer for synchronizing transfer of serial REQ#s/GNT#s by means of DMA serial channel protocol is provided in the PCI-DS bridge device 16.

The PC card controller 17 is a PCI bus master and supports DMA serial channel protocol. When PC cards 61 and 62, controlled by the PC card controller 17, request DMA transfer, this DMA request, i.e. a DREQ, is transferred to the RGM 1522 by serial transfer using the REQ# signal line allocated to the PC card controller 17. Further, a DACK# from the RGM 1522 is sent to the PC card controller 17 by serial transfer, using the GNT# signal line allocated to the PC card controller 17. The serial GNT# is decomposed into a DACK# by the PC card controller 17 and passed along to PC card 61 or 62.

The PCI DMA 18 is an agent on the internal PCI bus 2 similar to the PC card controller 17 and supports DMA serial channel protocol. When a DMA slave 19, controlled by the PCI DMA 18, requests DMA transfer, this DMA request, i.e. the DREQ, is transmitted to the RGM 1522 by a serial REQ#. Also, a serial GNT# from the RGM 1522 is formed into a DACK# by the PCI DMA 18 and sent to the DMA slave 19.

The DS-PCI/ISA bridge device 20 is a bridge LSI for connecting the docking bus (corresponding to the PCI bus), leading out to the desk station from the main body of the computer via the DS connector, to the external PCI bus 4 and the external ISA bus 5. The DS-PCI/ISA bridge device 20 is one PCI master similar to the PC card controller and supports the DMA serial channel protocol.

The EPBB 201 receives through the PCI-DS bridge device 20 memory cycles and I/O cycles generated by the ISA DMAC on the internal PCI bus 2, and sends them to the external PCI bus 4. Further, where a bus access enable is granted to the PCI master device 41 on the external PCI bus 4, the EPBB 201 generates an external PCI bus transaction on the desk station.

The EIBB 202 receives through the PCI-DS bridge device 20 memory cycles and I/O cycles generated by the ISA DMAC 1521 on the internal PCI bus 2, protocol-converts them, and sends them to the external ISA bus 4. Further, where a bus access enable is granted to the ISA master device 51 on the external ISA bus 5, the EIBB 202 generates an external ISA bus transaction on the desk station.

The LBA 203 and the EIDR 204 are provided to support the DMA serial channel protocol. The LBA 203 monitors changes in the states of bus access requests REQ# from the PCI bus master 41 on the external PCI bus 4 and DREQ signals (basically of the amount of ISA DMA channels) from the ISA master 51 on the external ISA bus 5 and the DMA slaves 52 and 53, and sends the most recent state through the PCI-DS bridge device 20 by serial transfer of a bit line using a serial REQ# to the RGM 1522.

The format of the bit string transmitted by a serial REQ# is preferably as follows:

| | s 0 1 2 3 4 5 6 7 |
|---|---|
| REQ# | H, H, H, L, H, L, H, L, H, L, L, H, L, L |

The LBA 203 takes the leading edge of the activated REQ# as the start bit (S), thereafter using DMA channels 0 to 7 per each clock frame and sending them in series. The frame of channel 4 is preferably used to send changes in the bus request state of the PCI master 41, while the other channels are used to send changes in the states of DMA requests of the ISA master 51 and the DMA slaves 52 and 53 on the external ISA bus 5.

In each frame, an "L" is taken to mean that there is no request and an "H" is taken to mean that there is a request. In the above example, DREQs 0, 2 and 7 are active and correspond to a state where the PCI master 4 on the external PCI bus 4 is requesting bus access, i.e., DREQ 4 is active.

The LBA 203 has two operating states, proceed and freeze. Until the LBA 203 receives a serial GNT# from the RGM 1522, the LBA 203 is in a proceed state and works to continuously send the most recent state to the RGM 1522. In a proceed state, whenever a change in the state of an REQ# of the PCI bus master 41 on the external PCI bus 4 or in the state of DREQs of the ISA master 51 and DMA slaves 52 and 53 on the external ISA 5 bus is generated, the RGM 1522 is notified by the DMA serial channel protocol.

When a serial GNT# is received from the RGM 1522, the LBA 203 decodes the bit string including the serial GNT# and either returns a DACK# to the EIDR 204 or returns a GNT# on the external PCI bus 4.

The format of the bit string transmitted by the serial GNT# from the RGM 1522 is as follows:

| | s 0 1 2 3 |
|---|---|
| GNT# | H, H, H, L, H, L, L, L, L |

The RGM 1522 takes the leading edge of the activated GNT# as the start bit (S). Thereafter the RGM 1522 allocates, one bit per one clock frame, in sequence from the LSB, information 3-bit coded from one of the DMA channel DACK#s 0 to 7, and sends it in series. The code of channel 4 is preferably used to send a GNT# corresponding to a bus request state of the PCI master 41 on the external PCI bus 4, while all other codes are used to send DACK#s corresponding to DMA requests of the ISA master 51 and the DMA slaves 52 and 53 on the external ISA bus 5. According to this example, the DMA channel 1, which is channel code=1, was selected and thus DACK1# was supplied.

Upon receiving a GNT#, the operating state of the LBA 203 is switched from a proceed state to a freeze state. The freeze state is maintained until the device, either the PCI master 41, the ISA master 51 or one of the DMA slaves 52 or 53, corresponding to the GNT# withdraws its bus access request. At this time, execution of serial REQ# cycles for reporting such operating states are frozen, even if changes in the states of other devices occur, and REQ#s continue to be maintained in active states.

In the DMA serial channel protocol of this system, the frame allocated by the use of the PCI master 41 is preferably channel 4 only, as a result of which where a plurality of PCI masters 41 exist on the external PCI bus 4, arbitration between REQ#s from the plurality of PCI masters is performed by the LBA 203.

The EIDR 204 changes mapped DMA channels into the ISA master 51 and DMA slaves 52 and 53 on the external ISA bus 5, according to programmed mapping information. By cooperation of the EIDR 204 and the previously described IIDR 1523, DMA channels can be exclusively allocated to devices on the internal ISA bus 3 and devices on the external ISA bus 5.

The EIDR 204 changes the state of DREQ signals from each of the ISA master 51 and the DMA slaves 52 and 53 to DREQ signals corresponding to the DMA channel numbers of these devices, according to mapping information, and sends the signals to the LBA 203. Further, the EIDR 204 changes DACK#s from the LBA 203 into DACK#s actually used by the ISA master 51 and the DMA slaves 52 and 53, according to mapping information, and outputs the signals to the external ISA bus 5.

The allocation of the configuration addresses to the I/O registers in the ISA DMAC 1521 is illustrated with respect to FIGS. 2 and 3.

Both the I/O address and the configuration address are respectively allocated in the registers in each DMA channel. All the registers can be read or written via the configuration addresses. The system of the present invention has a memory address space, an I/O address space, and a configuration address space. The memory address space and I/O address space are used respectively for memory access and the I/O access of the system. The configuration address space is used for accessing a configuration register in an agent on the PCI bus.

The type of bus cycle executed on the internal PCI bus 2 is distinguished by the command or byte-enable bus, such as C/BE3#, C/BE2#, C/BE1#, and C/BE0#, on the internal PCI bus 2. An initiator, which begins a transaction, specifies a target for the period of an address phase. In addition, the initiator specifies a transfer type by driving the command or byte-enable bus for that period.

The target specified by an address executes a decode of the command or byte-enable bus. The target decides the executed transfer type such as an I/O read, an I/O write, a memory read, a memory write, a configuration read, or a configuration write, as a result of the decode operation.

The ISA DMAC 1521 preferably includes an I/O address decoder, an I/O write control circuit, and an I/O read circuit, to access I/O control registers therein, in response to an I/O read or write cycle. In addition, the ISA DMAC 1521 preferably has a configuration address decoder, a configuration write control circuit, and a configuration read circuit, to access the I/O control registers therein, in response to a configuration read or write cycle. The configuration address decoder, the configuration write control circuit, and the configuration read circuit corresponding to the configuration read or write cycle, are used to access configuration registers in the PCI-ISA bridge device 20. Additionally, access of the I/O control registers in the ISA DMAC 1521 is also performed. Read or write access of the I/O registers in the ISA DMAC 1521 is executed by using register control logic, in response to the configuration read or write cycle.

The register control logic installed in the ISA DMAC 1521 is explained with reference to FIG. 4. In either an I/O write cycle or in a configuration write cycle, write data on the internal PCI bus 2 is input to a data input terminal of D-type flip-flop 101 that consists of one register. A latch signal generated by a gate circuit G1–G3 is input to a clock input terminal of the D-type flip-flop 101.

An IOW# signal, indicating that an I/O write cycle has been executed, and an IO decode# signal, indicating that the value of a I/O address has been specified, are input to an AND gate G1, which has negative-true logic. Further, a config. write# signal, indicating that a configuration write cycle has been executed, and a config. decode# signal, indicating that the value of a configuration address has been specified, are input to an AND gate G2, which has negative-true logic. The outputs of the AND gates G1 and G2 are supplied to the D-type flip-flop 101 as a latch signal through the OR gate G3. In an I/O write cycle or a configuration write cycle, when the address of the D-type flip-flop 101 is specified for an address phase period, write access to the D-type flip-flop can be executed.

Data is output from the D-type flip-flop 101 to two output ports 102 and 103 through two AND gates G4 and G5. Specifically, the data output from the D-type flip-flop 101 is supplied to an input terminal of the AND gate G4. The output of an AND gate G6, having negative-true logic, is supplied to the other input terminal of the AND gate G4. The data output from the D-type flip-flop 101 is also supplied to an input terminal of the AND gate G5. The output of an AND gate G7, having negative-true logic, is supplied to the other input terminal of the AND gate G5.

An IOR# signal, indicating that an I/O read cycle has been executed, and an I/O decode# signal, indicating that the value of an I/O address has been specified, are input to the AND gate G6. A config. read# signal, indicating that a configuration read cycle has been executed, and a config. decode# signal, indicating that the value of a configuration address has been specified, are input to the AND gate G7. In an I/O read cycle, the data stored in the D-type flip-flop 101 are read out from the output port 102 by selecting the AND gate G4. Also, in a configuration read cycle, the data stored in the D-type flip-flop are read out from the output port 103, by selecting the AND gate G5.

Since write-only I/O registers in the ISA DMAC 1521 do not have either the output port 102 or the AND gate G4, in an I/O read cycle, data cannot be read out from the write-only I/O registers.

Next, basic timing charts to read-access or write-access one register, for example DMAC#1 ch.2 base address register in the ISA DMAC 1521, are explained with reference to FIGS. 5(A) and 5(B).

Figure 5A:
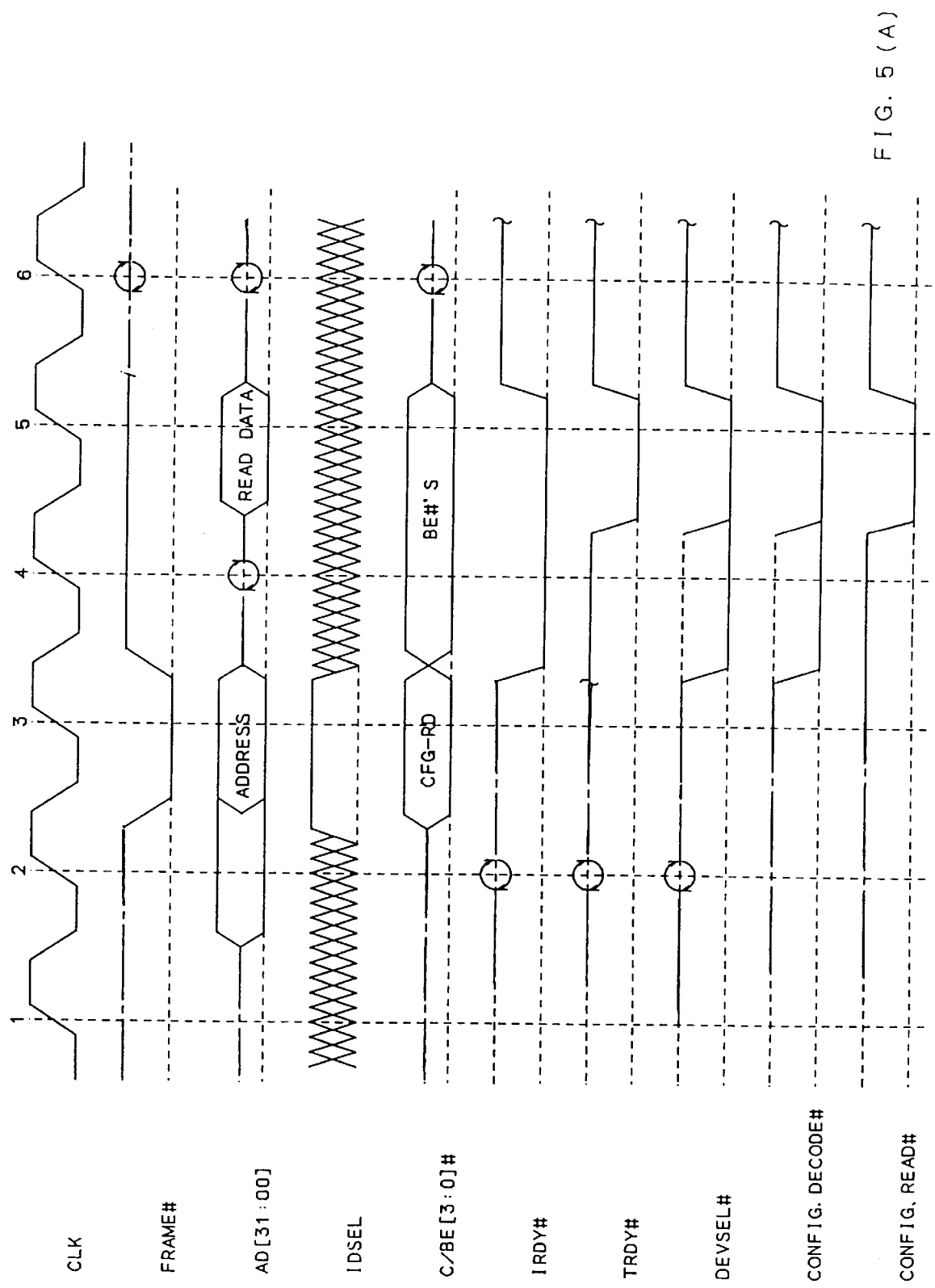

It is assumed that a signal is actively driven by a current master, such as a host-PCI bridge device or a target, such as a PCI-ISA bridge device, when it is drawn as a solid line in FIGS. 5(A) and 5(B). When a signal is drawn as a dashed line in FIGS. 5(A) and 5(B), no agent is actively driving it. Tri-stated signals are indicated to have indeterminate values when the dashed line is between the two rails. When a solid line becomes a dotted line, it indicates that the signal was actively driven and becomes tristated.

A PCI device on the internal PCI bus 2 decodes its own addresses for normal access. Access to the configuration space in the PCI device requires device external selection decoding, and signaling to the PCI device via an IDSEL pin, that functions as a "chip select" signal. A PCI device is a target of a configuration command (read or write) only if its IDSEL is asserted and the AD[1:0] are "00". Internal addressing of 64-DWORD space in the configuration register is executed by AD[7:2].

The selection signal to the IDSEL pin preferably allows its connection to one of the upper 21 address lines, which are not otherwise used in configuration access. AD[31:0] lines must be actively driven during an address phase. Thus, 21 different devices can be selected for configuration access, by connecting a different address line to each device, and by asserting one of the AD[31:11] lines at a time. Connecting one of the upper 21 AD lines to the IDSEL is an additional load on the AD line. This can be mitigated by resistively coupling the IDSEL to the appropriate AD line. However, this creates a very slow slew rate on the IDSEL, causing it to be in an invalid logic state most of the time with the "XXX" marks, as shown in FIGS. 5(A) and 5(B). However, since it is only used on the address phase of a configuration cycle, the address bus can be predriven a few clocks before FRAME#, guaranteeing IDSEL to be stable when it needs to be. For all other cycles, IDSEL is undefined and may be at a nondeterministic level during the address phase.

As shown in FIG. 5(A), the HOST-PCI bridge device 12 starts a configuration read transaction with an address phase that occurs when FRAME# is asserted for the first time and occurs on clock 3. During the address phase, AD[31:0] contains a valid address, for example 0001_00B0h, and C/BE[3:0]# contains a valid bus, for example 1010h. At the same time, the HOST-PCI bridge device 12 causes an AD[16] line to be at a high state, to select the PCI-ISA bridge device 12 as a target.

The first clock of the first data phase is clock 4. During the data phase, C/BE# indicates which byte lines are involved in the current data phase. In this case, C/BE# contains 1101h. The AD[15:8] lines are used for the read data transfer. The HOST-PC bridge device 12 remains enabled from clock 4 to clock 5.

The first data phase of a configuration read transaction requires a turnaround-cycle enforced by the PCI-ISA bridge device 12 via TRDY#. In this case, the address is valid on clock 3 and then the HOST-PCI bridge device 12 stops driving AD. The PCI-ISA bridge device 12 provides valid data on clock 5. In this case, AD[31:00] lines contain 0000_1200h. The PCI-ISA bridge device 12 must drive the AD lines following the turnaround cycle when DEVSEL# is asserted.

The data phase is completed when read data is transferred, which occurs when both IRDY# and TRDY# are asserted on clock 4. TRDY# cannot be driven until DEVSEL# is asserted. Only when IRDY# is asserted, can FRAME# be deasserted, which occurs on clock 4.

The PCI-ISA bridge device 12 decodes the latched AD and C/BE# data, and generates CONFIG. DECODE# and CONFIG. READ# signals that are provided to the register control logic when TRDY# is asserted. The register control logic reads data from the D-type flip-flop 101 (DMAC#1 ch.2 base address register) and outputs the read data, for example 0000_1200h to the port 103, which is connected to the internal PCI bus 2.

As shown in FIG. 5(B), the HOST-PCI bridge device 12 starts a configuration write transaction, when FRAME# is asserted for the first time, which occurs on clock 3. A configuration write transaction is similar to a configuration read transaction except no turnaround is required following the address phase because the HOST-PCI bridge device 12 provides both the address and the data. During the address phase, AD[31:0] contains a valid address, for example 0001_00B0h, and C/BE[3:0]# contains a valid bus, for example 1011h. At the same time, the HOST-PCI bridge device 12 causes an AD[16] line to be at a high state, to select the PCI-ISA bridge device 12 as a target.

The data phase is the same for the configuration read and write transactions. In the data phase, AD contains 0000_1200h and C/13E# contains 1101h. The PCI-ISA bridge device 12 decodes the latched AD and C/BE# data, and generates CONFIG. DECODE# and CONFIG. WRITE# signals that are provided to the register control logic when TRDY# is asserted. The register control logic writes the data to the D-type flip-flop 101 (DMAC#1 ch.2 base address register), when IRDY# is being asserted.

When the DMAC#1 ch.2 base address register is read-accessed via an I/O address space, address and data phases of the I/O read transaction operate the same as the configuration read transaction except for the operation of IDSEL#. In the address phase of the I/O read transaction, AD contains 0000_0004h, and C/BE# contains 0011h. In the data phase of the I/O read transaction, AD contains 0000_0012h and C/BE# contains 1110h. A byte pointer is used by indicating which AD lines have valid data. In this case, the byte pointer is preferably "1".

The PCI-ISA bridge device 12 decodes the latched AD and C/BE# data, and generates I/O DECODE# and I/OW# to be provided to the register control logic when TRDY# is asserted. The register control logic reads data from the D-type flip-flop 101 of the DMAC# ch.2 base address register and outputs the read data, for example 0000_0012h to the port 102, which is connected to the internal PCI bus.

Next, when the DMAC#1 ch.2 base address register is write-accessed via an I/O address space, address and data phases of the I/O write transaction operate the same as the configuration write transaction except the operation of IDSEL#. In the address phase of the I/O write transaction, AD contains 0000_0004h, and C/BE# contains 0010h. In the data phase of the I/O write transaction, AD contains 0000_0012h, and C/BE# contains 1110h.

The PCI-ISA bridge device 12 decodes the latched AD and C/BE# data, and generates I/O DECODE# and IOR# to be provided to the register control logic when TRDY# is asserted. The register control logic writes the data to the D flip-flop of DMAC#1 ch.2 base address register, when IRDY# is being asserted.

As mentioned above, the write-only registers in ISA DMAC 1521 are allocated to the I/O address and the configuration address according to the present invention. When the I/O address is used, the write-only registers can be write-only accessed. However, when the configuration address is used, the write-only registers can be read or write accessed.

In the I/O address used by the ISA standard architecture, write-only registers in the ISA DMAC 1521 operate as a write-only register. If the configuration address is used, the write-only registers in the ISA DMAC 1521 operate as readable or writable registers. Therefore, the write-only registers in the ISA DMAC 1521 can be read-accessed or write-accessed, maintaining compatibility with the ISA standard architecture.

Since all the DMAC registers can be read-accessed or write-accessed by the configuration address, debugging work for the ISA DMAC 1521 becomes easy in the system of the present invention. In particular, when the DMAC is installed in a PCI bus system, which is compatible with the ISA system, debugging work can efficiently be performed on a board.

Moreover, a suspend or a resume function can effectively execute even during DMA transfer by reading the write-only registers in the ISA DMAC 1521. When system power is turned off to suspend work in the computer system, the contents of all the ISA DMAC registers are stored into a back-up memory by read-accessing the configuration address allocated to the registers. Also, when the system power is turned on to resume the work in the computer system, the contents stored in the back-up memory can be restored to the DMAC registers by write-accessing the configuration address allocated to the registers. Further, in the resume routine, the states of CPU in the system are restored immediately before the suspend routine is executed.

According to the present invention, the configuration address is used to read-access or write-access the write-only DMAC registers. However, a second I/O address, different from the I/O address used by the ISA standard architecture, may be used. The write-only DMAC registers can be read-accessed or write-accessed through this second I/O address. This can be achieved by the following methods. An IOW# signal, indicating that an I/O write cycle has been executed by an I/O cycle decoder, and an IO decode# signal, indicating that the value of an I/O address has specified a second address value, are generated. These signals are input to the AND gate G2 in FIG. 4. In addition, an IOR# signal, indicating that an I/O read cycle has been executed, and an IO decode# signal, indicating that the value of an I/O address has specified a second address value, are generated. These signals are input to the AND gate G7 in FIG. 4.

According to the present invention, all registers in the ISA DMAC 1521 can be read-accessed or write-accessed through the configuration address.

While there has been illustrated and described what are considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

What is claimed is:

1. A computer system with a Direct Memory Access (DMA) controller comprising:

I/O registers, in the DMA controller, for storing information for DMA transfer on each of a plurality of DMA channels, the I/O registers being assigned to a first address space;

means for allocating a second address space different from the first address space to a write-only register in the I/O registers; and means for read-accessing any data out of the write-only register, in response to a read cycle in the second address space.

2. The computer system of claim 1, wherein the second address space is a configuration address space in a peripheral component interconnect architecture.

3. The computer system of claim 1, further comprising:

means for storing contents of the write-only register into a memory storage device through the second address space during a suspend processing of the computer system.

4. The computer system of claim 3, further comprising:

means for restoring the contents of the memory storage device to write-only register during a resume processing of the computer system; and means for resuming a function of the DMA controller to a state immediately before the suspend processing was executed.

5. The computer system of claim 2, further comprising means for generating the read cycle to read-access the write-only register through the second address space.

6. The computer system of claim 2, wherein the DMA controller is implemented in a PCI-ISA bridge device for connecting a PCI bus and an ISA bus.

7. The computer system of claim 6, wherein the PC-ISA bridge device comprises:

means for latching an address and a bus command on the PCI bus;

means for decoding the latched address and command;

means for generating a configuration decode signal and a configuration read signal, when the write-only register is read-accessed, according to the decoding means.

8. The computer system of claim 7, wherein the read-accessing means includes register control logic means, implemented in the PCI-ISA bridge device, for reading data from the write-only register, and for outputting the read data to the PCI bus through an output port therein.

9. A computer system having an I/O address space, and a configuration address space, comprising:

a PCI-ISA bridge device for coupling a PCI bus and an ISA bus;

a Direct Memory Access (AMA) controller, implemented in the PCI-ISA bridge device, with two or more DMA channels;

a write-only I/O register implemented in the DMA controller for storing information for DMA transfer on each of the DMA channels, the I/O register being assigned to the PO address space;

means for allocating the configuration address space to the I/O register;

means for generating a configuration read cycle on the PCI bus; and means for read-accessing any data out of the I/O register, in response to the configuration read cycle.

10. The computer system of claim 9, wherein the I/O register includes a plurality of write-only registers.

11. The computer system of claim 10, further comprising means for generating a configuration write cycle, and means for write-accessing the I/O register, in a response to the configuration write cycle.

12. The computer system of claim 11, wherein the PCI-ISA bridge device includes register control logic means for accessing the I/O register.

13. A method of read-accessing I/O registers in a Direct Memory Access (DMA) controller with two or more DMA channels, the method comprising the steps of:

allocating a first address space to the I/O registers including a write-only register;

allocating a second address space different from the first address space to the I/O register;

generating a configuration read cycle to read-access the I/O registers through the second address space; and reading any data out of the I/O registers, in response to the generated read cycle.

14. The method of claim 13, wherein the generating step includes the step of generating an address and a bus command on a PCI bus.

15. The method of claim 14, further comprising the steps of:

latching the address and the bus command; and decoding the latched address and bus command.

16. The method of claim 15, wherein the generating step comprises the step of generating a configuration decode signal and a configuration read signal.

17. The method of claim 16, wherein the reading step comprises the step of outputting the read data out of the I/O registers to an output port of the write-only register.

18. The method of claim 14, wherein the generating step comprises the step of generating a configuration write cycle to write-access the I/O registers through the second address space.

19. The method of claim 18, further comprising the steps of generating a configuration decode signal and a configuration write signal, according to the decoded address and bus command; and outputting the configuration decode and configuration write signals to a clock terminal of the I/O registers.

20. The method of claim 19, further comprising the step of writing data to the I/O registers, in response to the output configuration decode and configuration write signals.

* * * * *